US007197217B1

United States Patent
Voyagis et al.

(10) Patent No.: US 7,197,217 B1
(45) Date of Patent: Mar. 27, 2007

(54) METHOD OF MAKING A FIBEROPTIC LIGHT GUIDE

(75) Inventors: Harry Voyagis, Southbridge, MA (US); Antonio Galarza, Jacksonville, FL (US); Bryant Thigpen, Jacksonville, FL (US)

(73) Assignee: Sunoptic Technologies LLC, Jacksonville, FL (US)

( * ) Notice: Subject to any disclaimer, the term of this patent is extended or adjusted under 35 U.S.C. 154(b) by 0 days.

(21) Appl. No.: 11/172,402

(22) Filed: Jun. 30, 2005

(51) Int. Cl.
G02B 6/04 (2006.01)
C03B 37/028 (2006.01)

(52) U.S. Cl. .................. 385/115; 65/409; 65/411
(58) Field of Classification Search ........ 385/115–116, 385/120–121; 65/409, 411
See application file for complete search history.

(56) References Cited

U.S. PATENT DOCUMENTS

| | | | |
|---|---|---|---|
| 2,314,804 A | 3/1943 | Willson | 428/210 |
| 2,339,928 A | 1/1944 | Hood | 501/35 |
| 2,748,020 A | 5/1956 | Parsons et al. | 428/434 |
| 3,650,598 A | 3/1972 | Kitano et al. | 385/124 |
| 3,902,881 A | 9/1975 | Pirooz | 65/30.13 |
| 4,846,546 A | 7/1989 | Cuda | 385/116 |
| 4,961,025 A * | 10/1990 | Thomas et al. | 313/524 |
| 4,989,960 A | 2/1991 | Thomas | 359/738 |
| 5,078,773 A | 1/1992 | Thomas | 65/37 |
| 5,259,057 A | 11/1993 | Cook | 385/120 |
| 5,351,332 A | 9/1994 | Cook | 385/116 |
| 5,371,826 A | 12/1994 | Friedman | 385/115 |
| 6,158,246 A | 12/2000 | Borrelli et al. | 65/30.1 |
| 6,658,896 B2 | 12/2003 | Galarza | 65/408 |
| 6,807,344 B2 | 10/2004 | Galarza | 385/43 |

* cited by examiner

Primary Examiner—John D. Lee
(74) Attorney, Agent, or Firm—Howson & Howson

(57) ABSTRACT

A method of making a fiberoptic light guide utilizes a hollow glass cladding blackened by chemical reduction. The cladding has a predetermined lead content and is heated to an elevated temperature in an atmosphere of substantially 100% hydrogen gas in a furnace. The blackening step is accomplished before or after a bundle of optic fibers is inserted within the cladding and is drawn to produce a fused fiberoptic rod. The blackening step provides the cladding with a black opaque nature that inhibits the transmission of light transversely through the cladding.

20 Claims, 4 Drawing Sheets

```
┌─────────────────────────────────────┐
│ Form a Fused Fiberoptic Rod by      │
│ Drawing a Fiberoptic Bundle Jacketed│
│ with a Hollow Glass Cladding        │
│ Containing Lead                     │
└─────────────────────────────────────┘
                  │
                  ▼
┌─────────────────────────────────────┐
│ Cut, Taper and/or Bend Tip of Rod   │
└─────────────────────────────────────┘
                  │
                  ▼
┌─────────────────────────────────────┐
│ Blacken Cladding by Heating in a    │
│ Reducing Atmosphere                 │
└─────────────────────────────────────┘
                  │
                  ▼
┌─────────────────────────────────────┐
│ Polish Ends of Rod and Secure One   │
│ End with an End Fitting             │
└─────────────────────────────────────┘
```

FIG. 3

METHOD OF MAKING A FIBEROPTIC LIGHT GUIDE

BACKGROUND OF THE INVENTION

The present invention relates to light guides utilized, for instance, in curing resins in medical, dental, scientific, industrial and military applications.

Light guides can be utilized to expose photocurable materials to high intensity visible light to change the materials from a paste-like putty to a substance having the hardness of ceramic or glass in a few seconds. Thus, for example, such probes have been utilized in dental procedures to harden photocurable sealants, adhesives and filler material for filling dental cavities. Of course, such a probe can be utilized in any application which requires an accurately directed high intensity light beam.

U.S. Pat. Nos. 6,658,896 and 6,807,344 issued to Galarza and U.S. Pat. No. 4,846,546 issued to Cuda disclose fiberoptic light guides useable as dental probes and methods of making fiberoptic light guides. The elongate fiberoptic probes have bent distal ends enabling high intensity light beams to be accurately directed within the mouths of patients during dental procedures. Another fiberoptic dental probe is disclosed in U.S. Pat. No. 5,371,826 issued to Friedman.

U.S. Pat. No. 2,314,804 issued to Willson; U.S. Pat. No. 2,339,928 issued to Hood; U.S. Pat. No. 2,748,020 issued to Parsons et al.; U.S. Pat. No. 3,650,598 issued to Kitano et al.; and U.S. Pat. No. 3,902,881 issued to Pirooz disclose processes for blackening glass in a hydrogen atmosphere at an elevated temperature. The Willson and Pirooz patents relate to the production of decorative glass articles; the Hood patent relates to producing glass fibers for use as textiles; the Parsons patent relates to forming non-reflecting black coatings on the edges of optical lenses and prisms; and the Kitano patent relates to producing a light conducting glass body with an outer light absorbent layer. In addition, U.S. Pat. Nos. 4,989,960 and 5,078,773 issued to Thomas disclose blackening an outer surface of an optical lens; U.S. Pat. Nos. 5,259,057 and 5,351,332 issued to Cook disclose the production of fiber optic face plates; and U.S. Pat. No. 6,158,246 issued to Borrelli et al. discloses a method of forming color gradients or decorative patterns on glass surfaces.

Although the aforementioned light guides and methods of manufacture may function in a satisfactory manner for their intended purposes, there is a need for a fiberoptic light guide that can be efficiently manufactured and that can be utilized to concentrate high intensity light.

SUMMARY OF THE INVENTION

The present invention provides a novel method of making a fiberoptic light guide. A bundle of closely-packed, elongate optic fibers are inserted into a hollow glass cladding having a predetermined content of lead and/or lead oxides. The fibers and cladding are heated and drawn to fuse the optic fibers together and to seal the bundle of optic fibers within the cladding thereby forming an elongate fused fiberoptic rod. Thereafter, the fused fiberoptic rod is heated within a furnace to a predetermined temperature in an atmosphere of substantially 100% hydrogen gas thereby blackening the cladding by chemical reduction. Alternatively, the hollow glass cladding can be blackened by chemical reduction before the bundle of closely-packed, elongate optic fibers are inserted into the cladding and drawn to produce the fused fiberoptic rod.

Another aspect of the present invention relates to a fiberoptic light guide made in accordance to the above referenced methods. The light guide has a body made from a single continuous fused fiberoptic rod that has an elongate cylindrical proximal end of substantially constant diameter and a distal end having a bent, tapered tip of reduced diameter. According to one contemplated embodiment, the fiberoptic light guide is a dental probe.

BRIEF DESCRIPTION OF THE DRAWINGS

The foregoing and other objects, features and advantages of the present invention should become apparent from the following description when taken in conjunction with the accompanying drawings, in which:

FIG. 3 is a block diagram of the steps of a method according to the present invention;

DETAILED DESCRIPTION OF THE INVENTION

The present invention relates to a method of making a fiberoptic light guide and to the structure and configuration of a light guide made by the method. The light guides according to the present invention can be utilized, for instance, in medical, dental, scientific, industrial, and military applications. Before turning to the details of the method, a description of the details of a specific dental probe made in accordance to the present invention is provided. Of course, the method can also be utilized to make light guides of other configurations used for other purposes.

Figure 1:
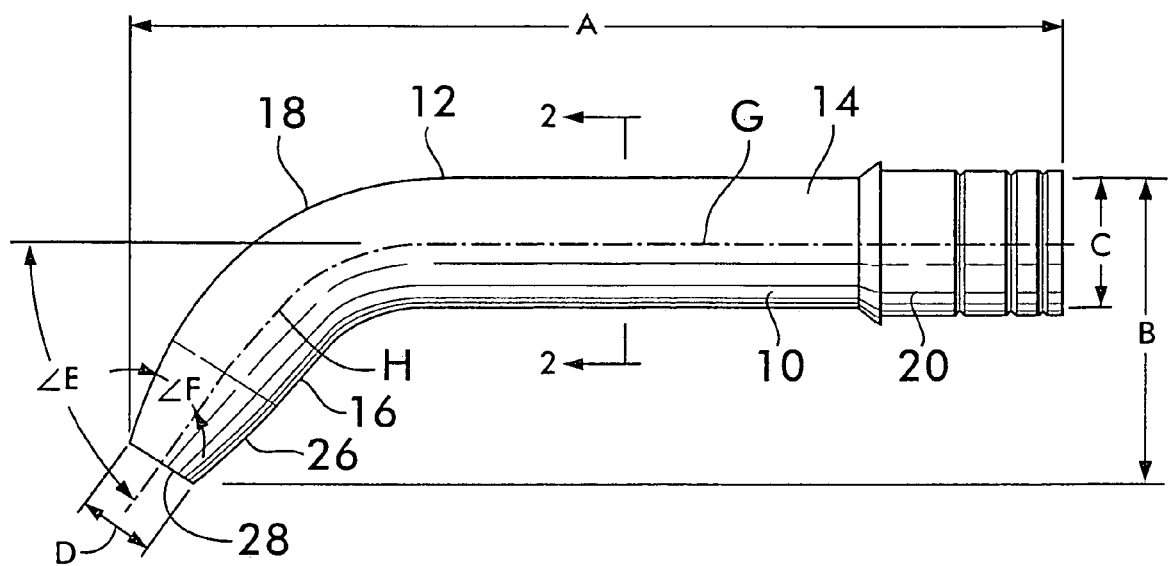
FIG. 1 is an elevational view of a fiberoptic light probe according to the present invention.
Figure 2:
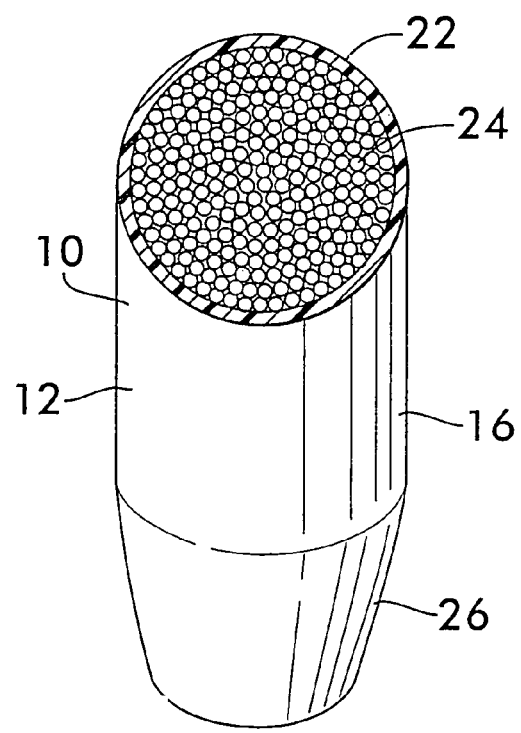
FIG. 2 is a cross-sectional view of the probe of FIG. 1 along line 2—2.

A light guide 10 is illustrated in FIGS. 1 and 2 and is particularly useful as a dental light probe for use in curing photocurable materials during dental procedures. The light guide 10 has a probe body 12 with an elongate cylindrical proximal end 14 (ie. proximal to the dentist), a relatively short distal end 16, and an arcuate section 18 interconnecting the proximal and distal ends, 14 and 16. The light guide 10 also includes an end fitting 20 which is secured about an end section of the proximal end 14 of the body 12 and which enables the light guide 10 to be readily coupled to a high-intensity light source. Preferably, the end fitting 20 is made of stainless steel and is adhesively secured to the body 12.

The body 12 is made of a fused fiberoptic rod having a glass cladding 22. The use of a fused rod enables a packing fraction of a bundle of optic fibers 24 (see FIG. 2) within the cladding 22 to be over 90% which permits the light guide 10 to transmit considerably more light than a light guide which consists merely of a filled rod (ie. non-fused). As will be discussed in greater detail below, the glass cladding 22 inhibits the transmission of light transversely therethrough.

As best illustrated in FIG. 1, the body 12 has a substantially constant diameter "C" throughout its proximal end 14, arcuate section 18, and distal end 16 except for a relatively short tapered tip 26 extending from an end surface 28 of the distal end 16. The tip 26 tapers inwardly to the end surface 28 to further concentrate the high intensity light shining through the light guide 10. Other bent or non-bent tip configurations with or without tapered sections can also be utilized.

By way of example, and not by way of limitation, the body 12 can have a diameter "C" of about 13 mm and a tapered tip 26 with an end surface 28 having a diameter "D" of about 8 mm. Of course, other diameter "C"/"D" combinations can be utilized, such as, 12 mm/8 mm, 10 mm/6 mm, 10 mm/4 mm, 8 mm/4 mm and other "C"/"D" combinations. The tapered tip 26 can extend along an axis "H" (see FIG. 1) through the distal end 16 for about a 10 mm length where it tapers at a straight angle "F" (see FIG. 1) of about 15° relative to axis "H". The length "A" (see FIG. 1) of the light guide 10 can be about 3.5 inches with a height "B" (see FIG. 1) of the arcuate section 18 and distal end 16 being about 1.2 inches. The distal end 16 can extend along the axis "H" which, in turn, extends at an angle "E" (see FIG. 1) of about 60° from the longitudinal central axis "G" (see FIG. 1) of the proximal section 14. The fused rod can contain hundreds of optic fibers (see FIG. 2) which each extends continuously between the ends of the light guide 10 within glass cladding 22.

One process of manufacturing the light guide 10 according to the present invention is shown in the diagram of FIG. 3. A bundle of closely-packed, elongate optic fibers is inserted into a hollow glass cladding. The cladding and optic fibers are heated and drawn to fuse the bundle of optic fibers together and to seal the bundle of optic fibers within the cladding thereby forming an elongate fused fiberoptic rod. The drawing process step provides a high packing fraction and enables the rod to transmit considerably more light than is possible with the pre-drawn assembly.

After formation of the fused fiberoptic rod, it can be cut with a diamond jig to form a light guide of a desired length. If desired, an end of the light guide can be heated and stretched to form a tapered tip and/or can be heated and bent to form an arcuate section so that a distal end of the light guide is angled relative to its proximal end.

The glass cladding according to the present invention has a predetermined content of lead. For example, the lead content in the cladding 22 can be about 10% to about 25% by weight. Thus, after the fused fiberoptic rod is formed and cut to size, and after the tip of the rod is tapered and/or bent as desired, the rod is heated within a furnace to an elevated temperature in an atmosphere of substantially 100% hydrogen gas for a period of time necessary to reduce lead oxides in the cladding 22. This process step is referred to as "blackening by chemical reduction" and provides the cladding 22 with a black opaque nature that inhibits the transmission of light transversely through the cladding 22. By way of example, the rod can be heated in the furnace to a temperature of about 310° C. to about 400° C. for about 60 minutes to about 120 minutes.

Thereafter, a diamond jig can be utilized to grind and polish the ends of the light guide to ensure maximum light transmission therethrough. In addition, an end fitting can be secured to the proximal end of the light guide so that the light guide can be readily coupled to a high-intensity light source (not shown).

Figure 4:
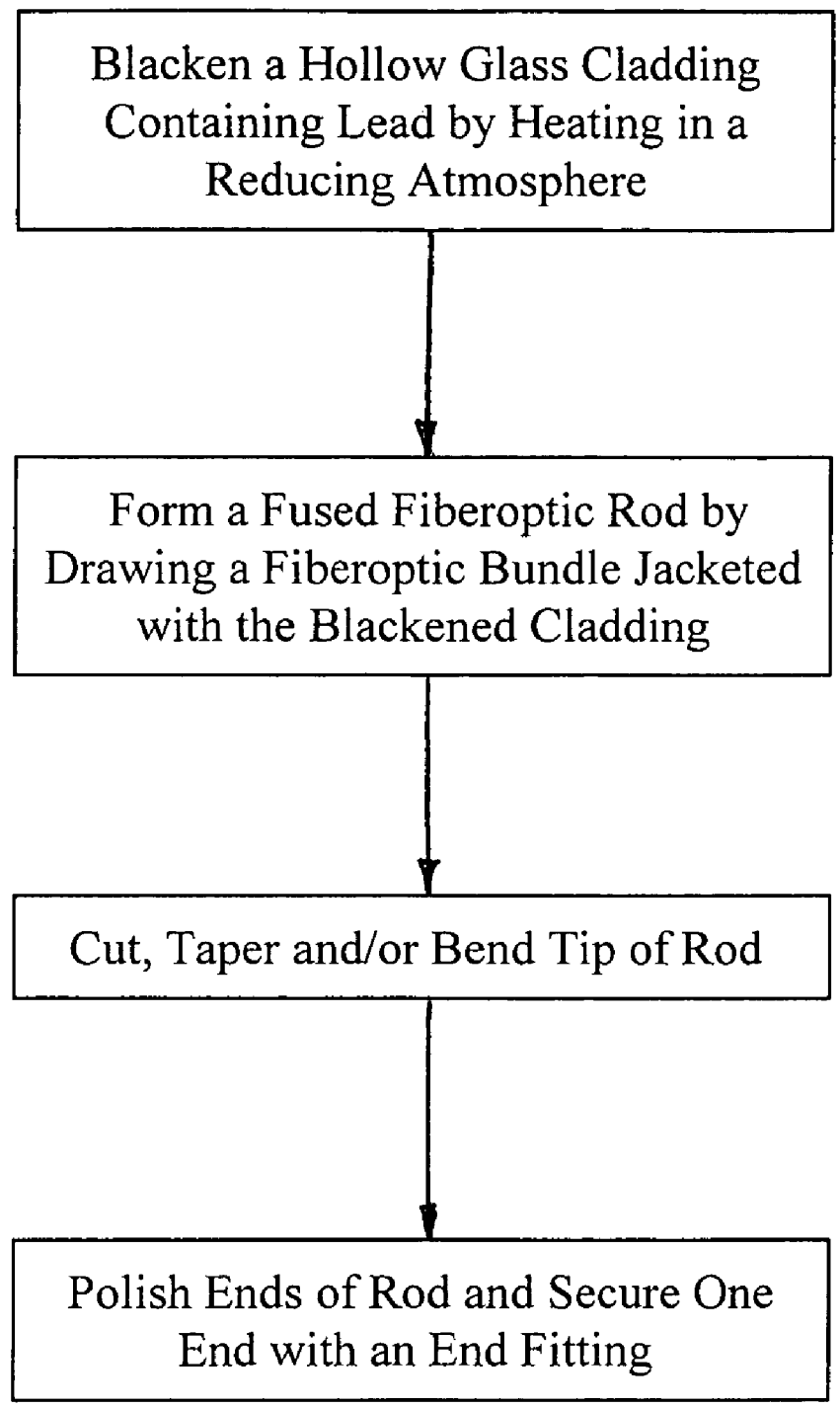
FIG. 4 is a block diagram of the steps of an alternate method according to the present invention.

FIG. 4 illustrates an alternate method according to the present invention. The hollow glass cladding is blackened by chemical reduction before a bundle of optic fibers is inserted into the cladding. Thus, after the lead-containing, hollow glass cladding is heated in an atmosphere of substantially 100% hydrogen gas and is thereby provided with a black opaque nature, a bundle of optic fibers is inserted into the cladding. This assembly is then heated and drawn to produce a fused fiberoptic rod. Process steps of cutting, tapering, bending, grinding, polishing, and applying an end fitting can thereafter be accomplished.

Figure 5:
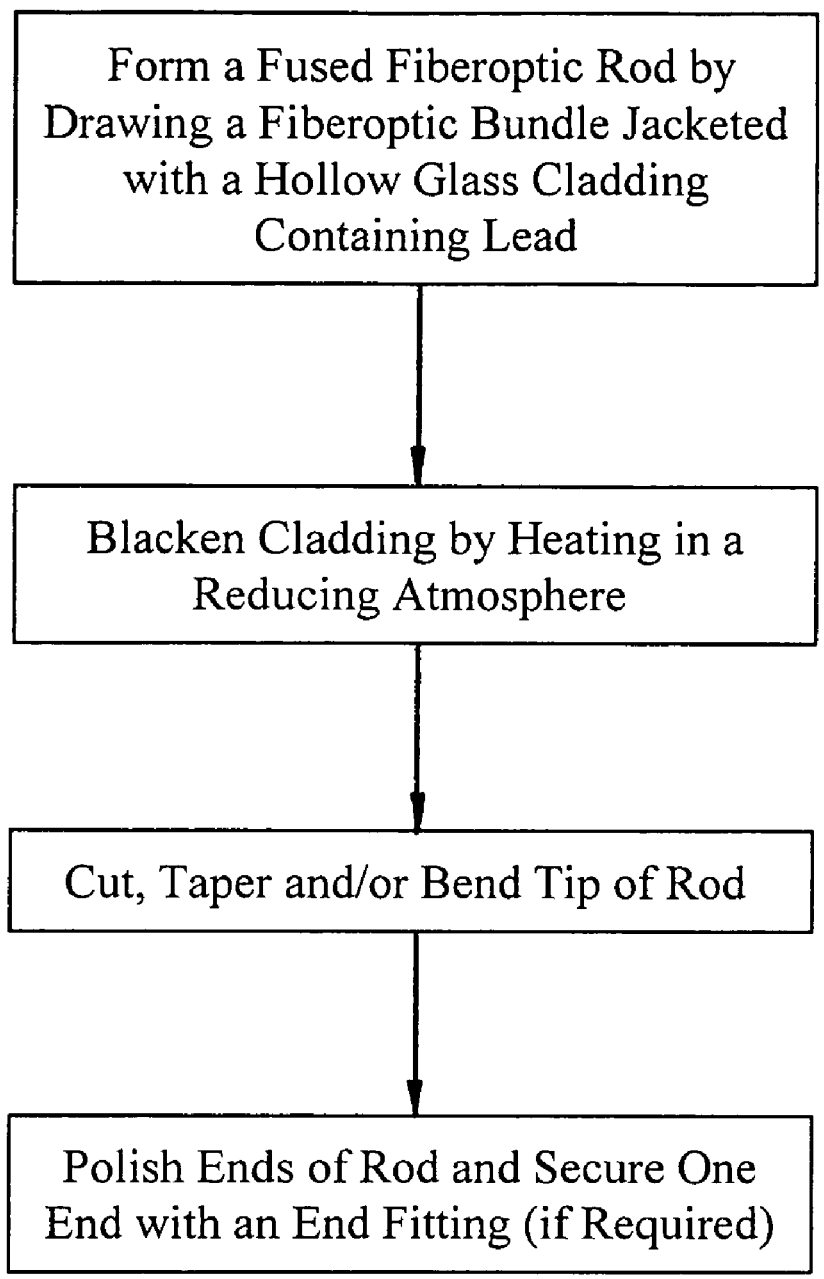
FIG. 5 is a block diagram of the steps of another alternate method according to the present invention.

FIG. 5 illustrates another alternate method according to the present invention. A bundle of optic fibers is inserted into the glass cladding, and this assembly is heated and drawn to produce a fused fiberoptic rod. Thereafter, the fused fiber optic rod is placed in a furnace and the cladding of the fused fiberoptic rod is blackened by chemical reduction. Process steps of cutting, tapering, bending, grinding, polishing, and applying an end fitting can thereafter be accomplished.

While preferred methods and light guides have been described in detail, various modifications, alterations, and changes may be made without departing from the spirit and scope of the method and light guide according to the present invention as defined in the appended claims.

The invention claimed is:

1. A method of making a fiberoptic light guide for use in curing photocurable materials, comprising the steps of:
   inserting a bundle of closely-packed, elongate optic fibers into a hollow glass cladding having a predetermined lead content;
   heating and drawing said cladding and optic fibers, after said inserting step, to fuse said bundle of optic fibers together and to seal said bundle of optic fibers within said cladding thereby forming an elongate fused fiberoptic rod; and
   placing said fused fiberoptic rod in a furnace and heating said rod to a predetermined temperature in an atmosphere of substantially 100% hydrogen gas thereby blackening said cladding by chemical reduction such that an outer peripheral surface of said fused fiberoptic rod formed by said cladding and extending lengthwise about said bundle of optic fibers is blackened along the length of said fused fiberoptic rod.

2. A method according to claim 1, further comprising the step of cutting said fused fiberoptic rod to a predetermined length before or after said step of placing said fused fiberoptic rod in a furnace and heating.

3. A method according to claim 1, further comprising the step of bending an end of said fused fiberoptic rod to form a bent tip before or after said step of placing said fused fiberoptic rod in a furnace and heating.

4. A method according to claim 1, further comprising the step of stretching an end of said fused fiberoptic rod to form a tapered tip before or after said step of placing said fused fiberoptic rod in a furnace and heating.

5. A method according to claim 1, further comprising the step of grinding and polishing opposite ends of the fused fiberoptic rod after said step of placing said fused fiberoptic rod in a furnace and heating.

6. A method according to claim 1, further comprising the steps of securing an end fitting to an end of the fused fiberoptic rod, after said cladding is blackened, and connecting the fused fiberoptic rod to a high intensity light generating apparatus.

7. A method according to claim 1, wherein said predetermined lead content of said cladding is 10% to 25% by weight.

8. A method according to claim 7, wherein said predetermined temperature to which said furnace is heated to blacken said cladding is at least about 310° C.

9. A method according to claim 8, wherein said fused fiberoptic rod is heated in said furnace for at least about 60 minutes to said predetermined temperature to blacken said cladding.

10. A method according to claim 9, further comprising the steps of bending and elongating an end of said fused fiberoptic rod to form a bent, tapered tip and cutting said fused fiberoptic rod to a predetermined length.

11. A method according to claim 10, further comprising the steps of grinding and polishing opposite ends of the fused fiberoptic rod after said cladding is blackened and securing an end fitting to one of said ends so that the fused fiberoptic rod can be connected to a high intensity light generating apparatus.

12. A method of making a fiberoptic light guide for use in curing photocurable materials, comprising the steps of:
   blackening by chemical reduction a hollow glass cladding having a predetermined lead content by heating said hollow glass cladding to a predetermined temperature in a furnace in an atmosphere of substantially 100% hydrogen gas;
   inserting a bundle of closely-packed, elongate optic fibers into said hollow glass cladding; and
   heating and drawing said cladding and optic fibers, after said inserting step, to fuse said bundle of optic fibers together and to seal said bundle of optic fibers within said cladding thereby forming an elongate fused fiberoptic rod such that an outer peripheral surface of said fused fiberoptic rod formed by said cladding and extending lengthwise about said bundle of optic fibers is blackened along the length of said fused fiberoptic rod.

13. A method according to claim 12, wherein said blackening step is performed after said inserting step.

14. A method according to claim 12, wherein said blackening step is performed before said inserting step.

15. A method according to claim 14, wherein said predetermined lead content of said cladding is 10% to 25% by weight.

16. A method according to claim 15, wherein, during said blackening step, said predetermined temperature in said furnace is at least about 310° C. and said cladding is heated to said predetermined temperature in said furnace for at least about 60 minutes.

17. A method according to claim 16, further comprising the steps of cutting said fused fiberoptic rod to a predetermined length, bending and stretching an end of said fused fiberoptic rod to form a bent tapered tip, grinding and polishing opposite ends of the fused fiberoptic rod, and securing an end fitting to one of said ends.

18. A fiberoptic light guide for use in curing photocurable materials prepared by a process comprising the steps of
   inserting a bundle of closely-packed, elongate optic fibers into a hollow glass cladding having a predetermined lead content;
   blackening said cladding along its length by chemical reduction by heating said cladding to a predetermined temperature in a furnace in an atmosphere of substantially 100% hydrogen gas; and
   drawing said cladding and optic fibers, after said inserting step, to fuse said bundle of optic fibers together and to seal said bundle of optic fibers within said cladding thereby forming an elongate fused fiberoptic rod;
   after said steps of blackening and drawing said fused fiber optic rod having an outer peripheral surface that is formed by said cladding, that extends lengthwise about said bundle of optic fibers, and that is blackened along its length.

19. A fiberoptic light guide according to claim 18, wherein said light guide has a body made from a single continuous fused fiberoptic rod which has an elongate cylindrical proximal end of substantially constant diameter and a distal end having a bent, tapered tip of reduced diameter.

20. A fiberoptic light guide according to claim 19, wherein said fiberoptic light guide is a dental probe.

* * * * *